United States Patent
Iizawa et al.

[11] Patent Number: 5,900,380
[45] Date of Patent: May 4, 1999

[54] CONDUCTIVE GLASS LINING COMPOSITION

[75] Inventors: Yoshihiro Iizawa; Mitsuru Akazawa, both of Saitama-ken, Japan

[73] Assignee: Ikebukuro Horo Kogyo Co., Ltd., Saitama-ken, Japan

[21] Appl. No.: 08/892,998

[22] Filed: Jul. 15, 1997

[30]  Foreign Application Priority Data

Jul. 19, 1996 [JP] Japan .................................. 8-190669
Nov. 27, 1996 [JP] Japan .................................. 8-316460

[51] Int. Cl.⁶ ........................................................ C03C 14/00
[52] U.S. Cl. ............................. 501/32; 501/19; 501/65; 501/66; 501/67; 501/71; 501/70; 501/72; 501/26
[58] Field of Search ................................. 501/32, 17, 19, 501/21, 26, 67, 70, 71, 65, 66, 72

[56] References Cited

U.S. PATENT DOCUMENTS 2,175,689  10/1939  Gallup ...................................... 250/167
4,407,868  10/1983  Iizawa ..................................... 427/376.2

FOREIGN PATENT DOCUMENTS 3535148   4/1987  Germany .
60-25380  6/1985  Japan .
4-8390    2/1992  Japan .

OTHER PUBLICATIONS

Chemical Abstracts, vol. 116, No. 2, Jan. 13, 1992, Columbus, Ohio, US; abstract No. 10293a, p. 231; XP000389473, abstract, & JP 03 199 138 A (Central Glass Co Ltd), Aug. 30, 1991.

Database WPI, Section Ch, Week 8330, Derwent Publications Ltd., London, GB; Class L02, AN 83–720094, XP002046192, & JP 58 102 997 A (Mitsubishi Electric Corp), Jun. 18, 1983, abstract.

Patent abstracts of Japan, vol. 018, No. 118 (C–1172), Feb. 25, 1994, & JP 05 310441 A (Ikebukuro Horo Kogyo KK), Nov. 22, 1993, abstract.

Database WPI, Section Ch, Week 8543, Derwent Publications Ltd., London, GB; Class L01, AN 85–265755, XP002046193, & JP 60 176 946 A (Ikebukuro Horo Kogyo Co), Sep. 11, 1985, abstract, & JP 04 008 390 B.

*Primary Examiner*—Michael Marcheschi
*Attorney, Agent, or Firm*—Wenderoth, Lind & Ponack, L.L.P.

[57]  ABSTRACT

A conductive glass lining composition includes 100 parts by weight of a frit and 0.05 to 1.5 parts by weight of a metal fibers of 0.1 to 30 $\mu$m in diameter, 1.5 to 10 mm in length and a length-to-diameter ratio of not less than 50.

3 Claims, 1 Drawing Sheet

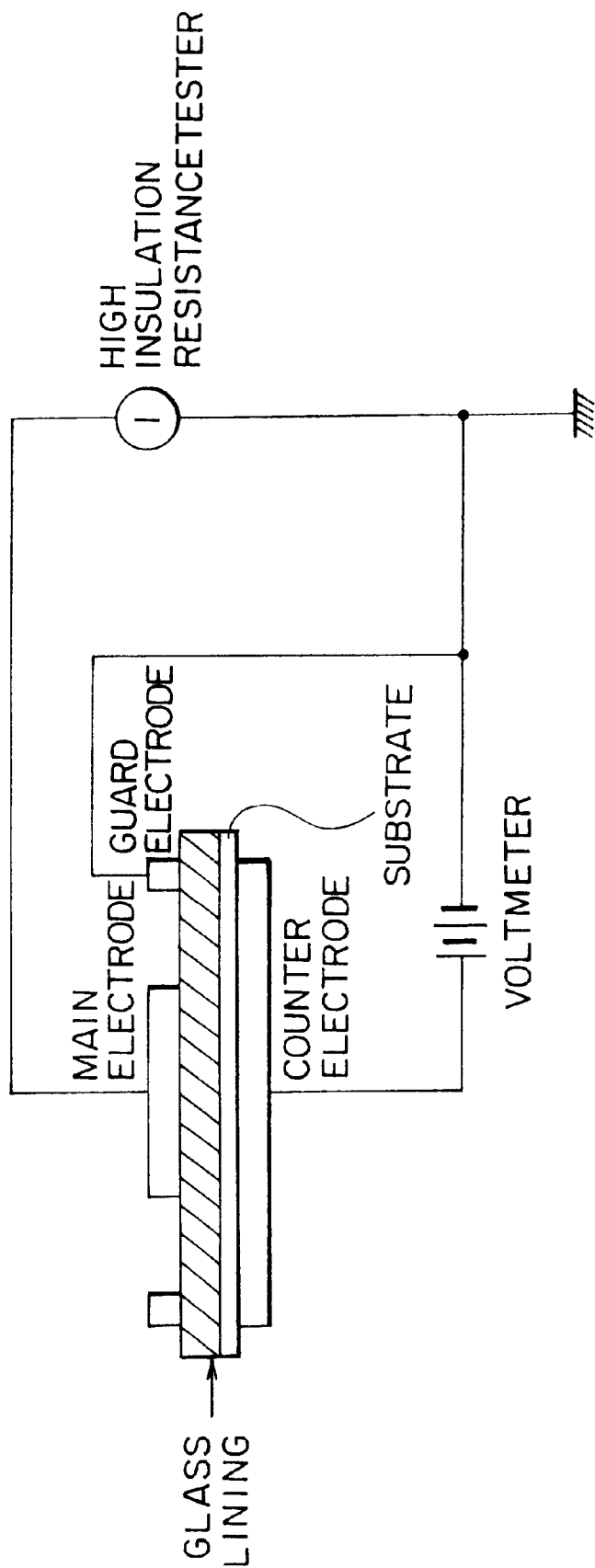

CONDUCTIVE GLASS LINING COMPOSITION

BACKGROUND OF THE INVENTION

1. Field of the Invention

The present invention relates to a conductive glass-lining composition for glass-lined equipment, using as a base material, low carbon steel plate or stainless steel plate that can withstand severe service conditions in the chemical industry, medical industry, food industry, etc.

2. Description of the Related Art

Conventional glass lining equipment has been produced by stoving a ground coat glaze with a thickness of approximately 0.2 to 0.4 mm on a base material such as low carbon steel plate or stainless steel plate so as to adhere the ground coat glaze strongly to the base material, and then by stoving a cover coat glaze having high corrosion resistance normally in a thickness of 0.8 to 2.0 mm.

Since the glass lining material that constitutes in the glass lined equipment is an insulating material having a volume resistivity of approximately $1 \times 10^{13}$ to $10^{14}$ Ωcm, if the glass lining equipment is operated and agitated using a non-aqueous organic liquid, the amount of electrified charge becomes much larger than that of the leak charge, generating tens or hundreds of thousands volts of static electricity, which may cause breakage or explosion of the glass lining material even if the glass lined equipment is grounded.

To prevent the above problems, when the glass lined equipment is operated to agitate non-aqueous organic liquid, Ta metal chips are embedded in a glass lining layer in advance or Ta metal wires are wound around the surface of a baffle or the like. However, it is difficult to coat the full surface of the glass lining with Ta metal, so no sufficient countermeasures for the static electricity have yet been reached. Furthermore, where the production of a great amount of the static electricity is predicted, metal equipment such as of stainless steel is used instead of glass lined equipment.

As an example of glass lined equipment having antistatic means, Japanese Utility Model Laid-Open No. 7-28834 discloses a glass lined metallic can where the inside walls thereof are covered with an under glass coating layer with an upper glass coating layer coated thereon wherein the upper glass is made of conductive glass embedded with platinum wire which is connected to the base material of the metallic can. However, the portion not embedded with platinum wire can not be expected to have much antistatic properties of the glass lining.

Further, Japanese Patent Publication No. 60-25380 discloses a method for fabricating a glass lined product by adding inorganic fibers 0.1 to 3 mm in length to a frit strip having a predetermined glass composition in which 2 to 10 percent of the fibers is added to 100 percent of the strip, and by glazing with a spray gun or in a immersion bath. The inorganic fibers exemplified in this Publication are materials that have been fiberized from glass having a different composition than enamel type glass or from commercial glass; natural mineral fibers such as rock fibers and kaowool; artificial ceramic fibers or whiskers such as zirconia, alumina, chromium oxide or the like. The object of adding the fibers is to reduce air bubbles in the enamel product, to prevent giant bubbles, and to improve color spot resistance, glazing crack (fissure) resistance, thermal shock resistance and mechanical shock resistance.

Japanese Patent Publication No. 4-8390 discloses a glaze composition including a frit wherein the glaze composition includes 100 parts by weight of the frit and 20 to 100 parts by weight of inorganic whiskers having diameters of 0.2 to 1 μm and a length-to-diameter ratio of not less than 20. The whiskers are inorganic single crystal fibers selected from the group consisting of titania, potassium titanate, alumina, silicon carbide and silicon nitride. The object of adding the whiskers is to import cutting machinability to the glass lining and to improve wear resistance.

Accordingly, an object of the present invention is to provide a conductive glass lining composition capable of providing a conductive glass lining showing excellent volume resistivity.

SUMMARY OF THE INVENTION

According to the present invention, the conductive glass lining composition includes 100 parts by weight of a frit and 0.05 to 1.5 parts by weight metal fibers that are 0.1 to 30 μm in diameter, 1.5 to 10 mm in length and have a length-to-diameter ratio of not less than 50.

BRIEF DESCRIPTION OF THE DRAWING

FIG. 1 is a schematic view showing a three-terminal measurement of volume resistivity in the samples obtained through the examples and the comparative examples.

DETAILED DESCRIPTION OF THE INVENTION

It is desirable that the diameters of the metal fibers used in the conductive glass lining composition of the present invention be small in view of the relation between the amount of the metal fibers added to the glass lining composition and the spray glazing performance of the composition. The diameters are in a range of from 0.1 to 30 μm, preferably from 0.5 to 10 μm. If the diameters of the metal fibers are less than 0.1 μm, the metal fibers are hard to process and their cost prevent their use at present. If the diameters exceed 30 μm, the slip viscosity of the glass lining composition becomes poor and the spray glazing performance becomes remarkably low. Thus, diameters of less than 0.1 μm and exceeding 30 μm are not preferable. The smaller the diameters of the metal fibers, the larger the apparent volume thereof is, so that a reduction in the amount of metal fibers added is posible and bears advantages when calcining the glass lining and from production engineering standpoint.

The lengths of the metal fibers range from 1.5 to 10 mm, preferably from 1.5 to 5.0 mm. If the lengths of the metal fibers are less than 1.5 mm, the metal fibers are hard to be cut shorter. If the lengths exceed 10 mm, the slip viscosity of the glass lining composition becomes poor and the spray glazing performance is remarkably lowered. Thus, lengths of less than 1.5 mm and exceeding 10 mm are not preferable.

The length-to-diameter ratio of the metal fibers should be not less than 50. If the length-to-diameter ratio of the metal fibers is less than 50, a great amount of the metal fibers is required to improve the conductivity of the glass lining. Thus, a length-to-diameter ratio of less than 50 is not preferable.

According to the conductive glass lining composition of the present invention, the dimensions of the metal fibers used therein are in the above-mentioned ranges. However, the dimensions and some parts of the metal fibers may be smaller than the above-mentioned ranges. When the metal fibers are mixed with a frit described later, the metal fibers are crushed and cut, resulting in smaller dimensions. The crushed and cut metal fibers may also be admixed together with metal fibers having dimensions in the above-mentioned ranges, when the conductive glass lining composition is glazed and coated. Such admixture has no effect on the conductivity obtained through the conductive glass lining coated layer.

The conductive glass lining composition of the present invention includes the metal fibers described above. Similar advantages can be obtained by adding metal powders such as platinum powders instead of adding the metal fibers to the frit. However, the addition of over ten percent of metal powder is required to obtain volume resistivity similar to that of the glass lining composition including metal fibers. As this increases costs, the metal powders cannot be practically used. Moreover, if more than ten percent of metal powder is added, it is difficult to obtain a smooth burned surface of the glass lining and further, bubbles are produced. Therefore, metal powders are not suitable in view of quality either.

The metal fibers are composed of more types of fibres selected from the group consisting of stainless steel type metals, noble metal group metals, and alloys of platinum and a platinum group metals. As for the stainless steel type metals, SUS-316 fibers having a volume resistivity of $7.4 \times 10^{-5}$ $\Omega$cm, SUS-304 fibers having a volume resistivity of $7.2 \times 10^{-5}$ $\Omega$cm and the like can be used. As for the noble metal group fibers, Ag fibers having a volume resistivity of $1.6 \times 10^{-6}$ $\Omega$cm, Au fibers having a volume resistivity of $2.4 \times 10^{-6}$ $\Omega$cm, Pt fibers having a volume resistivity of $10.6 \times 10^{-6}$ $\Omega$cm and the like can be used. As for the alloy fibers of platinum and platinum group metals, an alloy of Pt and Pd, Ir, Rh, Os and/or Ru can be used for example.

The conductive glass lining composition of the present invention can be used as a ground coat or a cover coat. As for the ground coat which requires no chemical oxidation resistance and requires strong adhesion to a base metal, inexpensive stainless steel group metal fibers are preferable. For the cover coat which requires chemical oxidation resistance, noble metal group metal fibers, alloy fibers and the like are preferable.

The amount of metal fibers added to 100 parts by weight of the frit is 0.05 to 1.5 parts by weight, preferably 0.05 to 1.0 parts by weight. If the additive amount of the metal fibers is less than 0.05 parts by weight, large improvements in conductivity cannot be expected. If the additive amount exceeds 1.5 parts by weight, the slip viscosity of the glass lining composition becomes poor and the spray glazing performance becomes remarkably low. Thus, an additive amount of less than 0.05 parts by weight and exceeding 1.5 parts by weight is not preferable. Within the above-mentioned range of the additive amount of the metal fibers, excellent glass lining quality can be achieved with no bubbles and no irregularities on the burned surface of the glass lining.

The frit used in the conductive glass lining composition of the present invention is not especially limited. Any ordinary frit can be used. For example, the following frits having compositions (A) to (E) can be used:

(A) 46 to 67 percent by weight (40 to 75 percent by mol) of $SiO_2+TiO_2+ZrO_2$, where $SiO_2$ is 46 to 67 percent by weight (40 to 75 percent by mol), $TiO_2$ is 0 to 18 percent by weight (0 to 20 percent by mol) and $ZrO_2$ is 0 to 12 percent by weight (0 to 12 percent by mol); percent by weight of (A) is calculated in terms of $SiO_2$;

(B) 8 to 22 percent by weight (7 to 22 percent by mol) of $R_2O$, where $Na_2O$ is 8 to 22 percent by weight (7 to 22 percent by mol), $K_2O$ is 0 to 16 percent by weight (0 to 15 percent by mol) and $Li_2O$ is 0 to 10 percent by weight (0 to 15 percent by mol); percent by weight of (B) is calculated in terms of $Na_2O$;

(C) 0.9 to 7 percent by weight (1 to 7 percent by mol) of RO, where CaO is 0.9 to 7 percent by weight (1 to 7 percent by mol), BaO is 0 to 6 percent by weight (0 to 6 percent by mol), ZnO is 0 to 6 percent by weight (0 to 6 percent by mol) and MgO is 0 to 5 percent by weight (0 to 6 percent by mol); percent by weight of (C) is calculated in terms of CaO;

(D) 0 to 22 percent by weight (0 to 20 percent by mol) of $B_2O_3+Al_2O_3$, where $B_2O_3$ is 0 to 22 percent by weight (0 to 20 percent by mol) and $Al_2O_3$ is 0 to 6 percent by weight (0 to 10 percent by mol); percent by weight of (D) is calculated in terms of $B_2O_3$;

(E) 0 to 5 percent by weight (0 to 4 percent by mol) of $CoO+NiO+MnO_2$, where CoO is 0 to 5 percent by weight (0 to 4 percent by mol), NiO is 0 to 5 percent by weight (0 to 4 percent by mol) and $MnO_2$ is 0 to 5 percent by weight (0 to 4 percent by mol); percent by weight of (E) is calculated in terms of CoO.

As a coloring component, at least one component selected from $Sb_2O_5$, $Cr_2O_3$, $Fe_2O_3$ and $SnO_2$ may also be added. The amount of the component added to 100 parts by weight of the frit composition is up to 5 percent by weight (5 percent by mol) calculated in terms of $Fe_2O_3$. For the purpose of facilitating frit fusion, up to 5 percent by mol of fluoride may be used in the $SiO_2$, CaO or $Na_2O$. For example, $Na_2SiF_6$ may be partially used instead of $SiO_2$ or $Na_2O$, $CaF_2$ instead of CaO and $Na_3AlF_6$ instead of $Al_2O_3$. Further, these components are all normally used in frits.

The glass lining composition of the present invention can be glazed on an ordinary base material, for example, a low carbon steel plate, a stainless steel plate or the like, by ordinary methods. It is a matter of course that various combinations of materials are applicable and glazing times can be changed depending on use. For example, an ordinary glass lining composition may be used as a ground coat and the conductive glass lining composition of the present invention used as the cover coat; the conductive glass lining composition of the present invention may be used as a ground coat and an ordinary glass lining composition used as the cover coat; or the conductive glass lining composition of the present invention is used both as the ground and cover coats.

According to the conductive glass lining composition of the present invention, a glass lining having low volume resistivity can be provided.

EXAMPLES

The conductive glass lining composition of the present invention will be further described below by the following Working and Comparative Examples.

Example

Table 1 shows compounding ratios (percent by weight) and composition percent by mol) used for a ground coat and a cover coat.

TABLE 1

|  | ground coat | cover coat |
|---|---|---|
| Compounding Ratio (percent by weight) | | |
| $SiO_2 + TiO_2 + ZrO_2$ | 41 | 61 |
| $R_2O(Na_2CO_3 + K_2CO + Li_2CO_3)$ | 25 | 23 |
| $RO(CaCO_3 + BaCO_3 + MgCO_3 + ZnCO_3)$ | 11 | 9 |
| $H_3BO_3 + Al_2O_3$ | 21 | 6 |
| $CoO + NiO + Mn_2CO_3$ | 2 | 1 |
| Composition (percent by mol) | | |
| $SiO_2 + TiO_2 + ZrO_2$ | 55 | 73 |
| $R_2O(Na_2O + K_2O + Li_2O)$ | 21 | 17 |
| $RO(CaO + BaO + MgO + ZnO)$ | 6 | 5 |
| $B_2O_3 + Al_2O_3$ | 15.5 | 4 |
| $CoO + NiO + MnO_2$ | 2.5 | 1 |

Mill formulas were prepared by mixing 100 parts by weight of the ground coat or the cover coat with various parts by weight of the metal fibers as shown in Table 2, 2 parts by weight of clay, 0.05 parts by weight of CMC, 0.3 parts by weight of barium chloride and an appropriate quantity of water. The mill formulas were glazed on a 1.0 mm thik low carbon steel round plate having a diameter of 105 mm under the burning conditions as shown in Table 2. The metal fibers were stainless steel fibers, and platinum fibers (1) and (2). The stainless steel fibers were manufactured by Nasu Bussan K.K. and were 8 $\mu$m in diameter and 5 mm in length. The platinum fibers (1) were manufactured by Tanaka Kikinzoku K.K. and were 8 $\mu$m in diameter and 2 mm in length. The platinum fibers (2) were also manufactured by Tanaka Kikinzoku K.K. being 0.5 $\mu$m in diameter and 2 mm in length. The platinum powders which were used in the Comparative Examples were manufactured by Koujundokagaku Kenkyuusho K.K. and were 1 to 10 $\mu$m in diameter.

TABLE 2

| | Inventive product | | | | | | | | | | | Comparative product | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| ground coat + stainless steel fibers | | | | | | | | | | | | | | ground coat + Pt powders | |
| parts by weight one-time glazing burned at 850° C. for 15 min. | 0.05 | 0.10 | 0.20 | 0 | 0.50 | 1.0 | 1.5 | | | | | — | — | 5% one-time glazing burned at 850° C. for 15 min. | 20% |
| ground coat + Pt fibers (2) | | | | | | | | | | | | | | | |
| parts by weight one-time glazing burned at 850° C. for 15 min. | | | | | | | | 0.05 | 0.5 | 1.0 | 1.5 | — | — | | |
| cover coat + stainless steel fibers | | | | | | | | | | | | | | cover coat + Pt powders | |
| parts by weight three-time glazing burned at 800° C. for 15 min. | 0.05 | 0.10 | — | — | — | — | — | | | | | — | — | 5% three-time glazing burned at 800° C. for 15 min. | 20% |
| cover coat + Pt fibers (1) | | | | | | | | | | | | | | | |
| parts by weight three-time glazing burned at 800° C. for 15 min. | — | — | 0.20 | 0.50 | 0 | 1.0 | 1.5 | | | | | — | — | | |
| cover coat + Pt fibers (2) | | | | | | | | | | | | | | | |
| parts by weight three-time glazing burned at 800° C. for 15 min. | | | | | | | | 0.4 | 0.5 | 1.0 | 1.5 | — | — | | |
| thickness of the ground coat (mm) | 0.35 | 0.37 | 0.30 | 0.28 | 0.30 | 0.30 | 0.30 | 0.30 | 0.33 | 0.35 | 0.35 | 0.30 | 0.30 | 0.32 | 0.35 |
| thickness of the cover coat (mm) | 0.95 | 0.93 | 0.95 | 1.10 | 1.20 | 1.30 | 1.10 | 0.90 | 0.95 | 1.00 | 1.10 | 1.10 | 1.00 | 1.00 | 1.10 |
| total thickness (mm) | 1.30 | 1.30 | 1.25 | 1.38 | 1.50 | 1.60 | 1.40 | 1.20 | 1.28 | 1.35 | 1.45 | 1.40 | 1.30 | 1.32 | 1.45 |
| volume resistivity ($\Omega$cm) | $1.0 \times 10^8$ | $9.0 \times 10^4$ | $8.0 \times 10^3$ | $1.5 \times 10^{10}$ | $1.3 \times 10^{11}$ | $2.0 \times 10$ | $1.3 \times 10^0$ | $1.8 \times 10^7$ | $1.3 \times 10^3$ | $1.0 \times 10^0$ | $0.5 \times 10^0$ | $5.4 \times 10^{13}$ | $5.4 \times 10^{13}$ | $2.5 \times 10^{14}$ | $4.7 \times 10^3$ |
| conductivity | ○ | ☻ | ☻ | Δ | Δ | ☻ | ☻ | ○ | ☻ | ☻ | ☻ | X | X | X | ☻ |

(Note)
conductivity
☻: very good
○: good
Δ: inferior
x: bad

The volume resistivity of the samples obtained was measured using a three-terminal method as shown in FIG. 1. The results are also shown in Table 2.

It is apparent from Table 2 that Examples 1 to 3 and 6 to 11 where the metal fibers were added to the ground and cover coats had remarkably lower volume resistivity and exhibited better conductivity than to Comparative Examples 12 and 13 where no metal fibers were added to the ground and cover coats.

The volume resistivity of Example 4 where no metal fibers were added to the ground coat was $1.5 \times 10^{10}$ Ωcm. The volume resistivity of Example 5 where no metal fibers were added to the cover coat was $1.3 \times 10^{11}$ Ωcm. Although these results do not exhibit noticeably lower values compared to Examples 1 to 3 and 6 to 11, they do exhibit better values when compared to Comparative Examples 12 and 13. Accordingly, Examples 4 and 5 can also be sufficient for practical use depending on costs and applications.

The volume resistivity of Comparative Example 14 where 5 parts by weight of platinum powders was added was $2.5 \times 10^{14}$ Ωcm. The volume resistivity of Comparative Example 15 where 20 parts by weight of platinum powders was added was $4.7 \times 10^{3}$ Ωcm. It is evident that an addition of 20 parts by weight of platinum powders results in a value of volume resistivity in the glass lining composition similar to that in the conductive glass lining composition of the present invention. However, the platinum powders are expensive and cannot be used in the glass lining in view of cost.

What is claimed is:

1. A conductive glass lining composition including 100 parts by weight of a frit and 0.05 to 1.5 parts by weight of metal fibers which are noble metal fibers or alloy fibers of platinum or platinum group metals of 0.1 to 30 μm in diameter, 1.5 to 10 mm in length and a length-to-diameter ratio of not less than 50.

2. The composition according to claim 1, wherein the metal fibers are platinum fibers.

3. The composition according to claim 1, wherein the frit has the following compositions (A) to (E):

(A) 46 to 67 percent by weight of $SiO_2+TiO_2+ZrO_2$, where $SiO_2$ is 46 to 67 percent by weight, $TiO_2$ is 0 to 18 percent by weight and $ZrO_2$ is 0 to 12 percent by weight;

(B) 8 to 22 percent by weight of $R_2O$, where $Na_2O$ is 8 to 22 percent by weight, $K_2O$ is 0 to 16 percent by weight and $Li_2O$ is 0 to 10 percent by weight;

(C) 0.9 to 7 percent by weight of RO, where CaO is 0.9 to 7 percent by weight, BaO is 0 to 6 percent by weight, ZnO is 0 to 6 percent by weight and MgO is 0 to 5 percent by weight;

(D) 0 to 22 percent by weight of $B_2O_3+Al_2O_3$, where $B_2O_3$ is 0 to 22 percent by weight and $Al_2O_3$ is 0 to 6 percent by weight; and (E) 0 to 5 percent by weight of $CoO+NiO+MnO_2$, where CoO is 0 to 5 percent by weight, NiO is 0 to 5 percent by weight and $MnO_2$ is 0 to 5 percent by weight.

\* \* \* \* \*